(12) United States Patent
Hiroike et al.

(10) Patent No.: US 6,760,030 B2
(45) Date of Patent: Jul. 6, 2004

(54) METHOD OF DISPLAYING OBJECTS IN A VIRTUAL 3-DIMENSIONAL SPACE

(75) Inventors: Atsushi Hiroike, Kawagoe (JP); Yoshinori Musha, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 143 days.

(21) Appl. No.: 09/759,246

(22) Filed: Jan. 16, 2001

(65) Prior Publication Data

US 2001/0009418 A1 Jul. 26, 2001

(30) Foreign Application Priority Data

Jan. 14, 2000 (JP) ........................................ 2000-010141

(51) Int. Cl.⁷ .............................................. G06T 15/70
(52) U.S. Cl. ..................................................... 345/473
(58) Field of Search ................................. 345/473–475

(56) References Cited

U.S. PATENT DOCUMENTS 5,764,241 A * 6/1998 Elliott et al. ................. 345/473
6,307,562 B1 * 10/2001 Taivalsaari ................... 345/473
6,320,582 B1 * 11/2001 Yamamoto et al. .......... 345/473
6,377,263 B1 * 4/2002 Falacara et al. ............. 345/473

* cited by examiner

*Primary Examiner*—Mark Zimmerman
*Assistant Examiner*—Enrique L Santiago
(74) *Attorney, Agent, or Firm*—Antonelli, Terry, Stout & Kraus, LLP

(57) ABSTRACT

Disclosed is a method of realizing both a function of making the user walk freely in a virtual three-dimensional space and a function of making the user watch of an overall view of an object in the space. Two reference objects having a function of making a turn according to a view point and a function of revolving around an object, separately, are prepared in a virtual three-dimensional space. A user interface is provided with a function of switching the user's view point between the two reference objects and a function of controlling the turn and translation of the reference objects.

9 Claims, 19 Drawing Sheets

METHOD OF DISPLAYING OBJECTS IN A VIRTUAL 3-DIMENSIONAL SPACE

BACKGROUND OF THE INVENTION

The present invention relates to a method of displaying objects in a virtual three-dimensional space and a storage medium on which a display program is recorded. More particularly, the invention provides a user interface devised to enable the user to freely walk through a virtual three-dimensional space displayed.

The technique of virtual three-dimensional display has been being applied to many fields of not only production of a video image of virtual three-dimensional computer graphics but also CAD, display of a result of scientific and technological calculation, and the like. In recent years, the technique is being applied also to fields such as information retrieval conventionally not related to virtual three-dimensional display (for example, Japanese Unexamined Patent Application Nos. 11-175534 and 2000-029885, and "Visualization of Image Feature Space using VR Space", by Hiroike, et al., IEICE Technical Report PRMU98-86 (1998-09), pp. 17 to 24).

Movement of the user through virtual three-dimensional (3D) space display is called "walk through". One of generally known user interfaces having the walk through function a browser for VRML. By using the browser, the user can freely walk through the virtual 3D world described by the VRML. The VRML browser usually provides two kinds of typical interfaces for walk through. One of the interfaces has a function of realizing turns to the up, down, right and left in the direction of the line of sight (z direction) using the view point as a center, forward/backward movements in the direction of the line of sight, and translation of the view point in a plane (x-y plane) perpendicular to the direction of the line of sight, and realizing a simulation of an ordinary walking motion of a human. The other interface is equivalent to the former one with respect to the movements but has a function of turning the virtual three-dimensional space around the origin of the virtual three-dimensional space. The function enables the user to watch around an object displayed in the space. It can be therefore said that, in the case of taking an entire view of an object, the latter interface is convenient.

SUMMARY OF THE INVENTION

Although the turns according to the view point are suited to a case where the user selects an arbitrary direction and moves in the direction in the space but are not convenient to take a view of an entire object in the space. On the other hand, the method of turning the space side is convenient to take a view of an entire object disposed in the center of the space but is inconvenient for the user to virtually freely move in the space. When a plurality of objects exist in the space and the user wishes to take a view of each of the objects, it is necessary to reset the center point of the space.

When a space in which a virtual three-dimensional display is performed is a space in a virtual building or the like, even if the structure in the space is complicated, the user can walk through the space by making turns according to the view point with a sense relatively close to regular motions. On the other hand, in a scene where the structure of the space is simple and the user watches a single virtual three-dimensional object, it is sufficient to turn the space side.

However, for example, in the case of applying the technique to the fields such as information retrieval, a virtual three-dimensional world generated does not always correspond to the real world the human experiences daily. In the cited technique of Unexamined Patent Application No. 2000-029885, image contents in a data base are visualized virtually, three-dimensionally by using the similarity between images as a scale of space. In this case, the derived space expresses information space generated by features of images, which is inherently an abstract world. A number of data is spread in a virtual three-dimensional space while having local structures. The world has a complicated space structure and is different from any of the worlds the human daily experiences. The user has to walk through the space and approach desired data. Only by the simple turns according to the view point, the user loses sight of the entire view of the distribution of data, so that it is difficult to perform an efficient walk through.

In order to grasp the entire view of the data distribution, it can be considered to turn the space side. However, since the structure of the space is complicated, it is not clear to set the center of the turn in the space. In the case where the user sets the center of the turn, if a specific object exists around the point to be set as a center, a user interface can be designed so as to select the object as a center of the turn. However, when an appropriate object does not exist around the position to be set as a center of the turn, designing of the user interface for setting the center point becomes an issue.

The problem occurring in the case where the conventional user interface for walk through is used will be continuously an obstacle in future in the case where the virtual three-dimensional display is applied to various fields. A user interface having higher functions and realizing the walk through with ease of operation is therefore necessary.

Two reference objects A and B are prepared in a virtual three-dimensional space. Both of them have the user's view point in a virtual three-dimensional space and are defined as reference objects moving different from each other.

The reference object A turns A itself. The reference object A has the function of making a turn according to the view point in the conventional technique. On the other hand, the reference object B revolves around the reference object A. Although the revolution is similar to the turn of the space itself in the conventional technique, since the reference object B itself revolves, the direction of turn is opposite to that of the conventional technique. The center of the revolution is an arbitrary position in the space where the reference object A is positioned. Since the reference object B revolves around the reference object A, the line of sight is always directed to the reference object A.

When the reference object A performs translation, the reference object B follows the movement of the reference object A while maintaining the relative positional relation with the reference object A and the relation of orientations. The movement of the reference object B is performed automatically, not by the user's operation.

The user can select his/her view point between that of the reference object A and that of the reference object B. Then, the turns, movement, and the like of each of the reference objects A and B are controlled. Consequently, the functions of making the user walk freely through a space and easily grasp an entire view of the space, which are difficult to be realized by the conventional walk through function, can be realized.

These and other objects, features and advantages of the present invention will become more apparent in view of the following detailed description of the preferred embodiments in conjunction with the accompanying drawings.

DESCRIPTION OF THE PREFERRED EMBODIMENTS

First Embodiment

Walk Through in Information Space for Image Retrieval

In this embodiment, the technique of the invention is applied to a user interface for retrieving a similar image.

1. System Configuration

Figure 1:
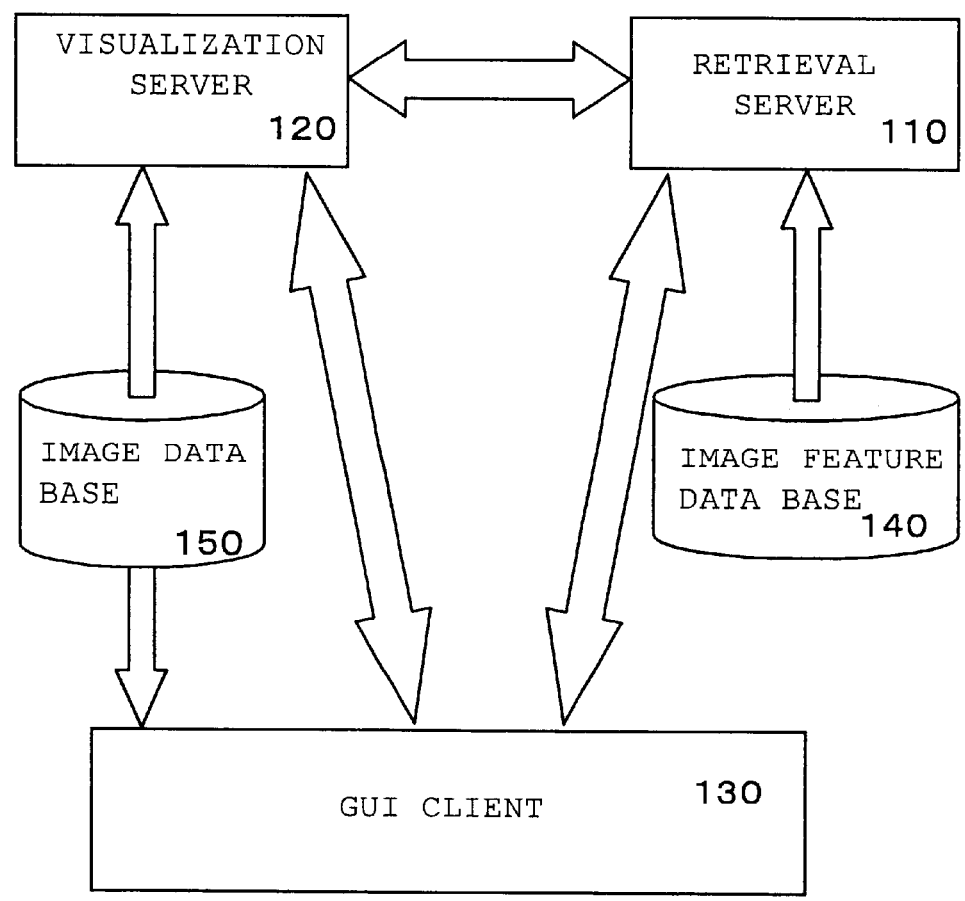
FIG. 1 is a block diagram showing a system configuration of a first embodiment.

FIG. 1 is a block diagram showing a system configuration of the embodiment. The system includes: a retrieval server 110 for performing retrieval based on an image feature; a visualization server 120 for displaying an image in a virtual three-dimensional space; and a GUI (Graphic User Interface) client 130. Information is transmitted between a server and a client by socket communication.

The retrieval server 110 calculates the similarity of an image with a retrieval key image on the basis of an image feature expanded in a built-in memory. The visualization server 120 updates a state in the virtual three-dimensional space in a real time fashion in association with motions of an object in the space and a walk through motion of the user. The GUI client 130 controls the walk through motion in the display area and designation of a retrieval condition.

The visualization server 120 and the GUI client 130 operate on a graphic workstation having a high-performance texture mapping function. The retrieval server 110 operates on the same computer or another computer capable of executing numerical calculation at high speed.

The retrieval server 110 fetches a feature of an entire image from the image feature data base 140 into the memory when the system starts. The visualization server 120 fetches an entire image data reduction image from the image data base 150 also when the system starts, converts the image into data for texture mapping, and stores the data into the built-in memory. The GUI client 130 fetches necessary image data from the image data base 150 at each time point.

Since the invention does not relate to the image retrieval itself and the details of retrieval and display of the retrieved data are described in the cited patent applications, the walk through will be mainly described hereinbelow.

Figure 5:
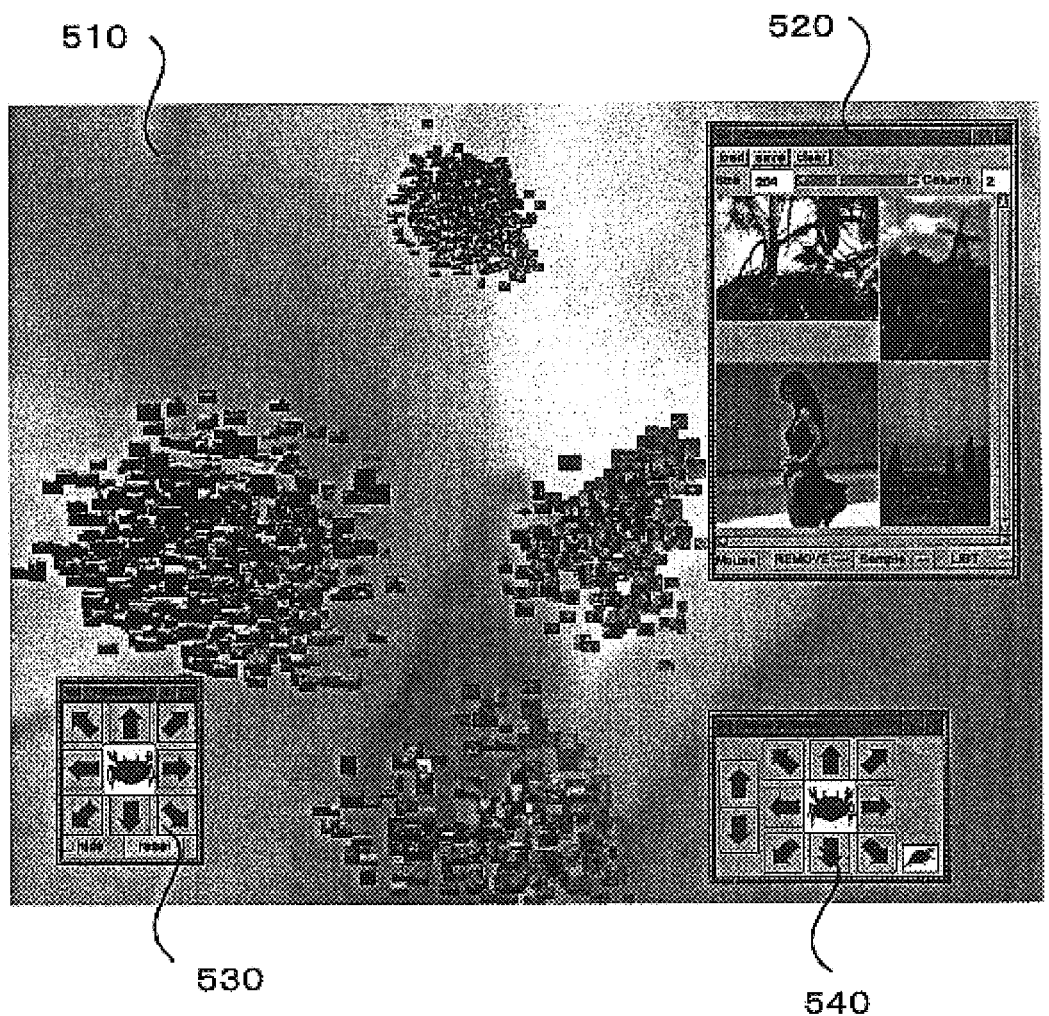
FIG. 5 is a diagram showing a display area and a display example of the panel in the first embodiment.

FIG. 5 is a display example in the embodiment. The user interface is constructed by a display area 510 of objects which can be seen from the view point of a reference object selected by the user among objects existing in a virtual three-dimensional visualization space created by the visualization server 120 and various panels 520, 530, and 540 displayed by the GUI client 130. The panel 520 is an example of a panel used for image retrieval and the panels 530 and 540 are panels used for walk through. In the display area 510, as shown in the drawing, small images according to the results of image retrieval are spread in groups according to keys of retrieval in the virtual 3D space.

2. Retrieval Function and Visualization Expression

By clicking a small image floating in the display area 510 with the mouse, the user can register the image as a new retrieval key. A key image registration request of the user is transmitted via the GUI client 130 to the retrieval server 110. An image determined by the retrieval server 110 that it is very similar to a set of key images is newly displayed as one of virtually, three-dimensionally spread small images. The sets of key images are displayed in the panel 520. The key image is eliminated by clicking the image in the panel 520 with the mouse. In an initial screen, retrieval results of sample images prepared by the system as retrieval keys are displayed.

The size of each image in the display area 510 of the virtual 3D visualization space is associated with the similarity in the feature space. The similarity is expressed by a real value from 0 to 1. At 1, an image is displayed at the maximum size. In the case of a real value smaller than 1, the image reduced in proportion to the similarity is displayed. In the case of 0.1 or smaller, the image is not displayed. The value of similarity is determined by a retrieval condition. The similarity is calculated in the retrieval server 110. In the embodiment, as an image feature related to colors, a histogram of a color distribution in an image is used. As an image feature related to shapes, a histogram of a distribution of direction components in a luminance gradient vector in an image is used. Both of the features are expressed as real number vectors. The similarity between images is defined on the basis of a square of distance between the vectors.

Equation 1 defines the similarity between a given image and a key image (expressed by a numerical subscript i).

$$s_i = \exp\left(-\sum_{j=1}^{2}\sum_{k}^{N_j}(f_{jk} - g^+_{ijk})^2\right) \quad \text{(Equation 1)}$$

In the case where a plurality of key images are registered, the similarity of a key image which is the most similar to the given image among the key images is defined as the similarity of the given image.

The visualization server 120 routinely updates the display area 510 in the virtual three-dimensional visualization space independent of the GUI client 130 and the retrieval server 110. A change in an image in the display area 510 in association with the walk through of the user is caused by control information sent from the GUI client 130 in response to the operation on the panel 530 or 540.

3. Walk Through Function

In the display area 510, an object having a view point of one of two reference objects named 'turtle' and 'crab' is displayed. The turtle and crab as reference objects have different view points and walk through functions. The reference object A corresponds to the turtle, and the reference object B corresponds to the crab. For simplicity, the turtle and crab as reference objects will be simply called as the turtle and crab by omitting the expression of "reference objects" as appropriate. The turtle has a function of making a turn of itself according to its view point as in the conventional technique. On the other hand, the crab revolves around the turtle as a center. This is similar to the turn of the space around its center in the conventional technique. However, since the crab itself revolves, the direction of the turn of an object displayed in the display area 510 is opposite to that in the conventional technique. It is assumed that the center of the revolving motion of the crab is an origin defined in the turtle. Since the crab revolves around the turtle, the line of sight of the crab is always directed to the turtle. In an image in the display area 510 seen from the crab's view point, the turtle always appears. On the other hand, the turtle can be oriented to an arbitrary direction. Consequently, the crab does not always appear in the image in the display area 510 seen from the view point of the turtle.

The user can freely choose between the view point of the turtle and that of the crab as his/her view point on the user interface. Then, turn, movement, and the like are controlled. FIG. 5 is a display example of the display area 510 seen from the crab. Although not clearly seen in FIG. 5, the turtle is displayed in a small size in the center portion of the field of view.

Figure 6:
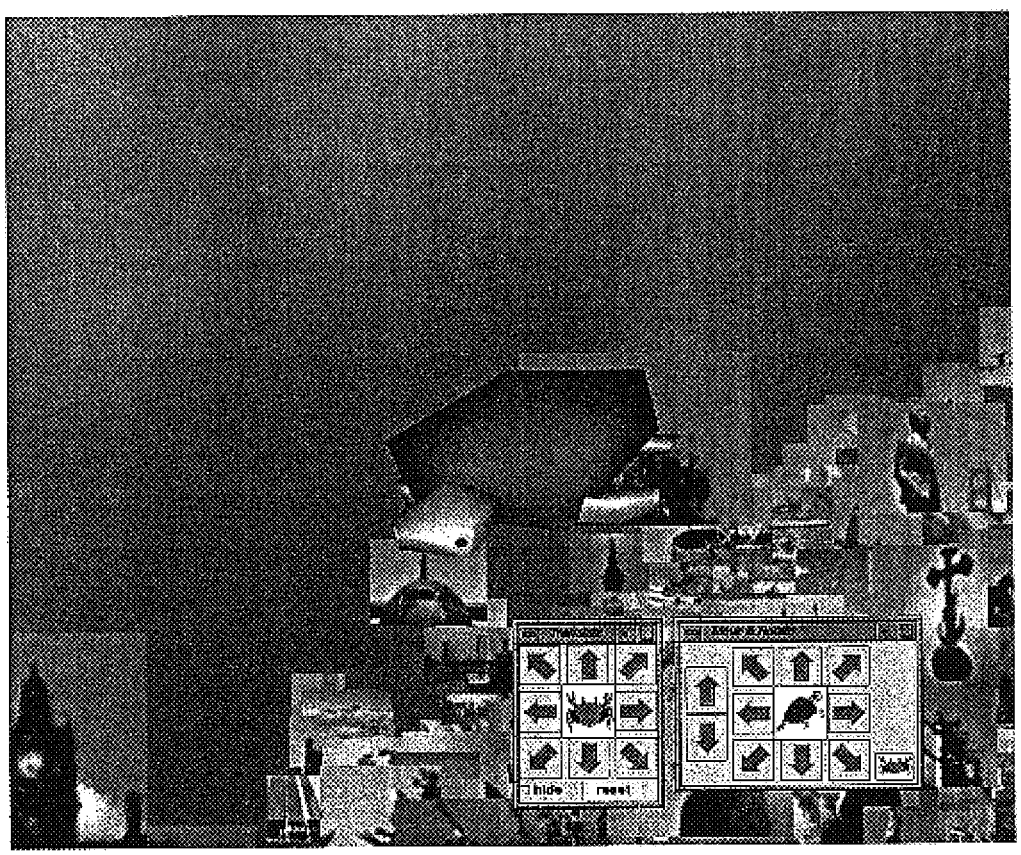
FIG. 6 is a diagram showing a display example in the case of seeing a turtle as one of reference objects in FIG. 5 from a close position.
Figure 7:
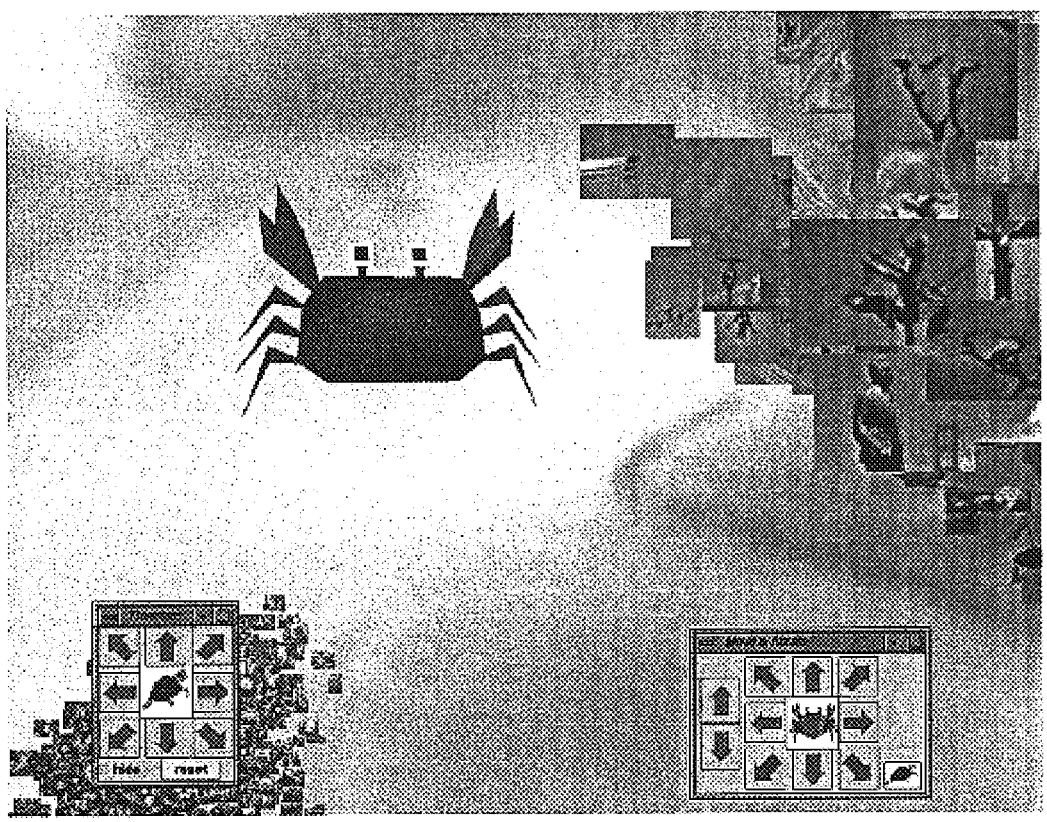
FIG. 7 is a diagram showing a display example in the case of seeing a crab as another one of reference objects in FIG. 5 from a close position.

FIG. 6 is a display example in the case where the turtle is seen in the vicinity of the turtle from the view point of the crab. Since the turtle approaches, the existence of the turtle becomes clear, but the number of objects displayed in the display area 510 decreases. FIG. 7 is a display example in the case of seeing the crab in the vicinity of the crab from the view point of the turtle. In FIGS. 6 and 7, the panel 520 prepared for image retrieval is not shown.

Figure 2:
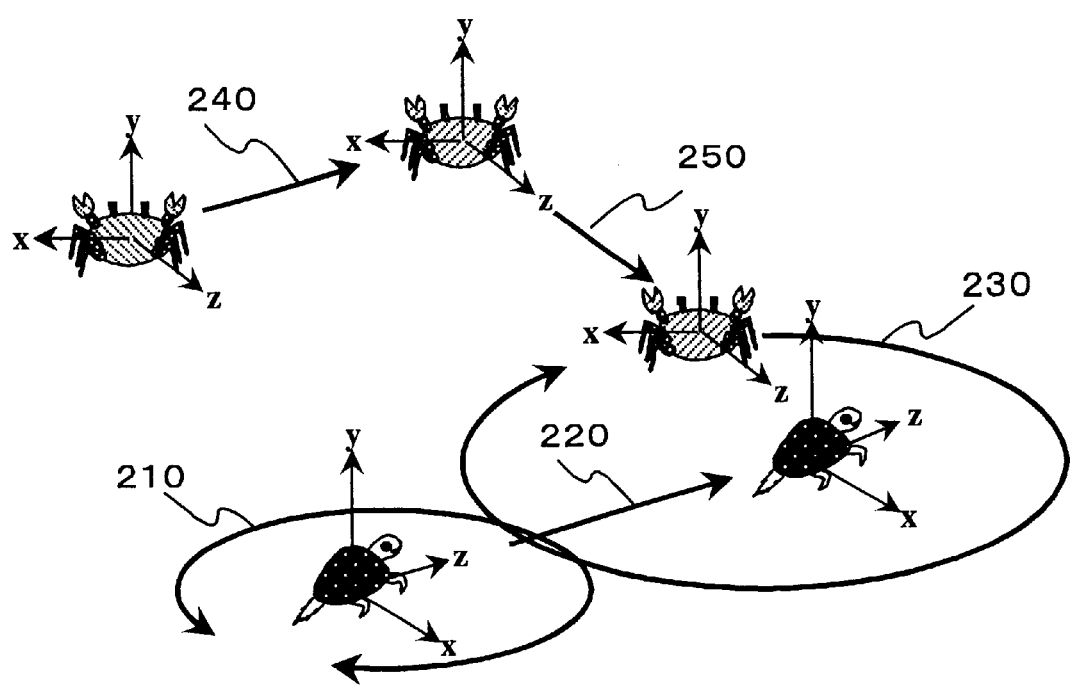
FIG. 2 is a conceptual diagram for specifically explaining movements of two reference objects.

FIG. 2 is a conceptual diagram for specifically explaining the motions of the crab and turtle as reference objects. Since the turtle is a reference object having the walk through function of the conventional type, by turning its head, the turtle can face to an arbitrary direction as shown by an arrow 210. As shown by an arrow 220, the turtle can move in the arbitrary direction the turtle faces. On the other hand, as shown by an arrow 240, while maintaining a distance to the turtle, the crab always faces the turtle and follows the turtle as the turtle moves. Voluntary translation of the crab is only approach or escape to/from the turtle as shown by an arrow 250. The revolution of the crab is always made around the turtle as shown by an arrow 230. For each of the crab and turtle, local coordinates expressed by x, y, and z are defined, and the plus direction of the z axis coincides with the direction of the line of sight of each of the crab and turtle. The plus direction of the y axis coincides with the vertical direction when it coincides with the view point of the object. Since each of the turtle and crab can move or revolve, the orientation varies accordingly. The orientation is determined by an orientation matrix of (3×3) expressed by absolute coordinates of the virtual three-dimensional space. As will be described hereinlater, there is a case that the user performs an operation of making the posture of the turtle and that of the crab coincide with each other to change the view point or the like. Coincidence of the postures denotes coincidence of the orientation matrixes.

As shown in FIG. 5, the panels 530 and 540 are displayed in the display area 510. The panels are used to operate the reference objects of the turtle and crab.

Figure 3:
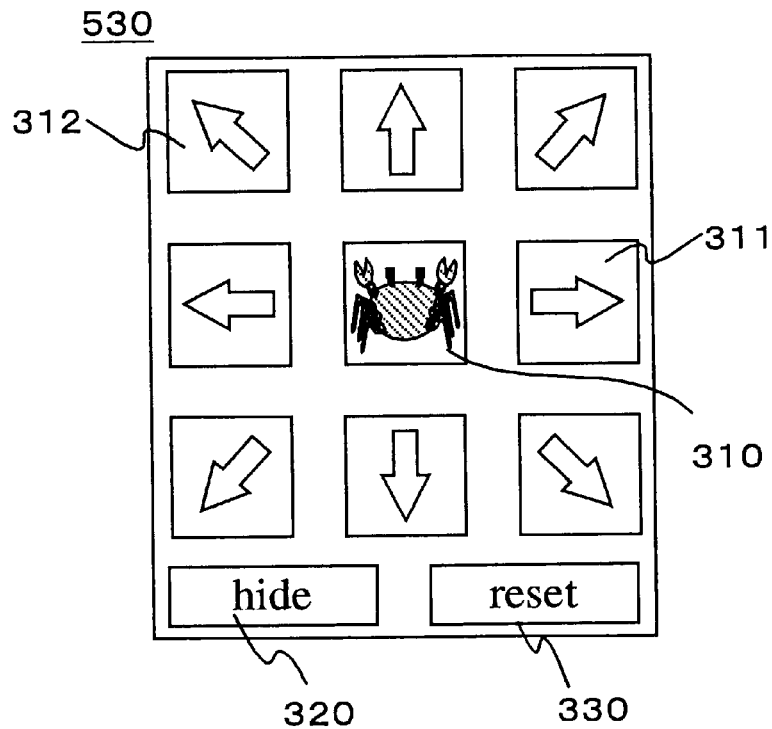
FIG. 3 is an enlarged view of the main portion of a panel for controlling translation in the (xy) direction of a reference object and switching of the user's view in the first embodiment.

FIG. 3 is an enlarged view of the main portion of the panel 530. The button 310 in the center of the panel is a toggle for switching the image in the display area 510 between an image seen from the view point of the crab (image seen from the crab) and an image seen from the view point of the turtle (image seen from the turtle). The image seen at that time point is indicated by the mark of the crab or turtle on the button 310. Consequently, when the mark on the button 310 is the crab as shown in FIG. 3, the turtle is seen in the center portion of the display area 510 as shown in FIG. 6. On the contrary, when the mark on the button 310 is the turtle, as shown in FIG. 7, there are cases where the crab is seen in the display area 510. However, since the turtle turns arbitrarily, in many cases, the crab is not seen in the display area 510 from the view point of the turtle. Eight buttons marked with arrows around the button 310 are buttons for translation in the (x, y) plane of the current view point. Reference numeral 320 denotes a toggle switch used to designate whether the crab or turtle is displayed in the display area 510 or not. According to the operation of the toggle switch 320, the crab or turtle is displayed or hidden in the display area 510. Reference numeral 330 is a switch for resetting the position of each reference object to the initial state. For example, the switch 330 is used to reset a state displayed as shown in FIG. 6 to the initial state as shown in FIG. 5.

Figure 4:
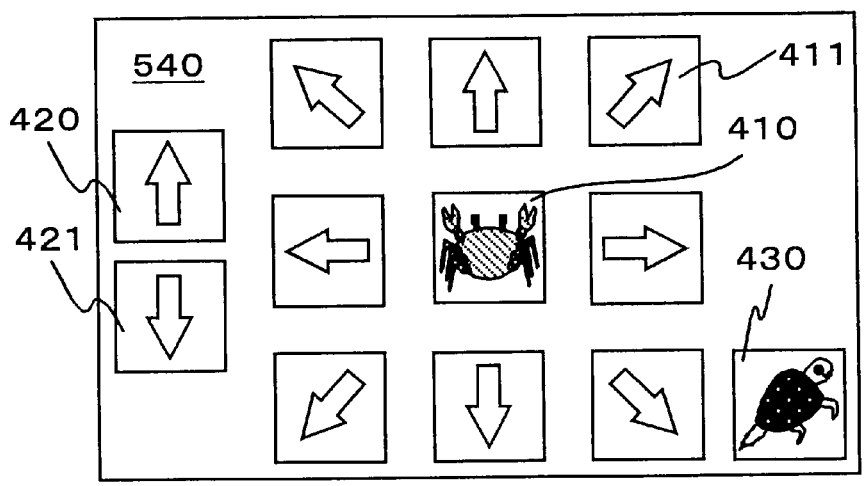
FIG. 4 is an enlarged view of the main portion of a panel for controlling turns and forward/backward movements of a reference object and switching of a control target in the first embodiment.

FIG. 4 is an enlarged view of the main portion of the panel 540. The panel is for the turns and forward/backward movements (movements in the z direction) of the reference object. A button 410 in the center is a toggle button for switching a reference object to be controlled. A control target at that time point is indicated by the mark of the crab or turtle on the button 410. When the mark of the button 410 is the crab as shown in FIG. 4, the turns and forward/backward movements (movements in the z direction) of the crab are controlled. Eight buttons around the button 410 are buttons for making a turn to the right, left, up, and down and oblique directions. The reference object turns according to the button operated. Two left buttons 420 and 421 arranged vertically are buttons for the forward motion and backward motion.

The speed of movement and turn controlled by each of the arrow buttons for movements and turns is switched in accordance with the buttons of the mouse clicked. Specifically, when the mouse has two buttons, the speed can be changed in two stages. When the mouse has three buttons, the speed can be changed in three stages. The motion starts when the button is pressed, and the motion stops when the button is released. The operation will be described more specifically hereinlater with reference to FIG. 14.

The switching of the view points and the switching of the control targets by the panels 530 and 540 shown in FIGS. 3 and 4, respectively, are independent of each other. The user can control the motion of the turtle while seeing the motion of the turtle from the view point of the crab. Consequently, the center of a turn of the crab can be easily set in a position proper to see an image distribution in the display area 510.

From the turtle's view point, the translation in the (x, y) plane in FIG. 3 functions as a short-cut of turn and movement. First, when the turtle itself makes a turn in a certain direction in the current (x, y) plane, the turtle moves forward, that is, to the z direction after the turn. On the other hand, from the crab's view point, the crab cannot freely make a turn by the above-described definition. The crab therefore moves in a manner such that "the turtle moves, thereby moving the view point of the crab". For example, when the user clicks the button 311 for movement to the right in the crab's view point (the mark on the button 310 in the panel 530 is the crab), first, the turtle turns to the direction which coincides with the right direction of the crab. After that, the turtle moves forward and the crab follows the motion of the turtle. As a result, the view point of the crab moves to the right side of the crab.

Figure 8:
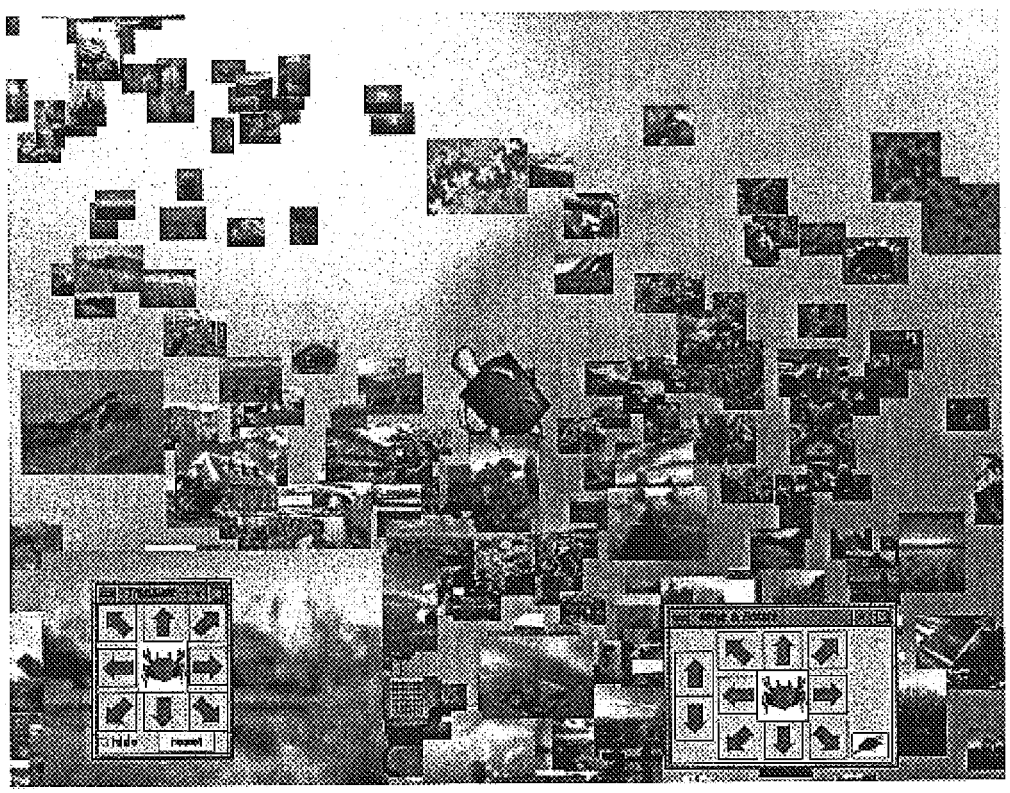
FIG. 8 is a diagram showing a display example of translation in an x-y plane from a view point of the crab as a reference object.
Figure 9:
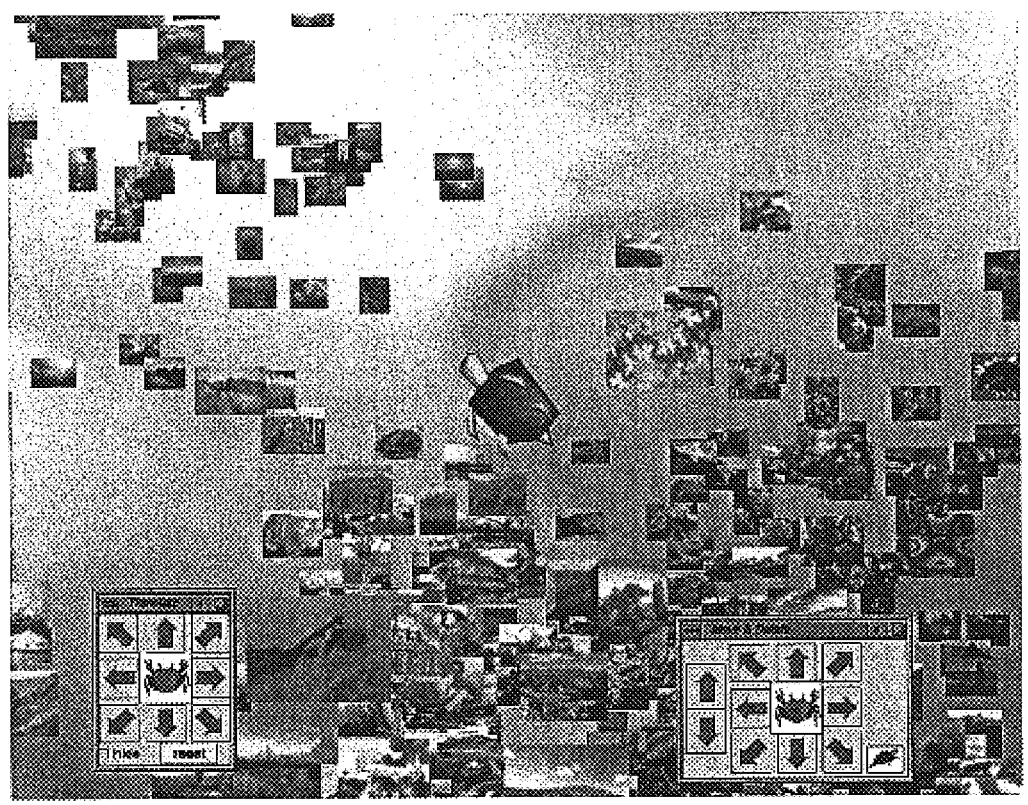
FIG. 9 is a diagram showing another display example of translation in the x-y plane from the view point of the crab as a reference object.
Figure 10:
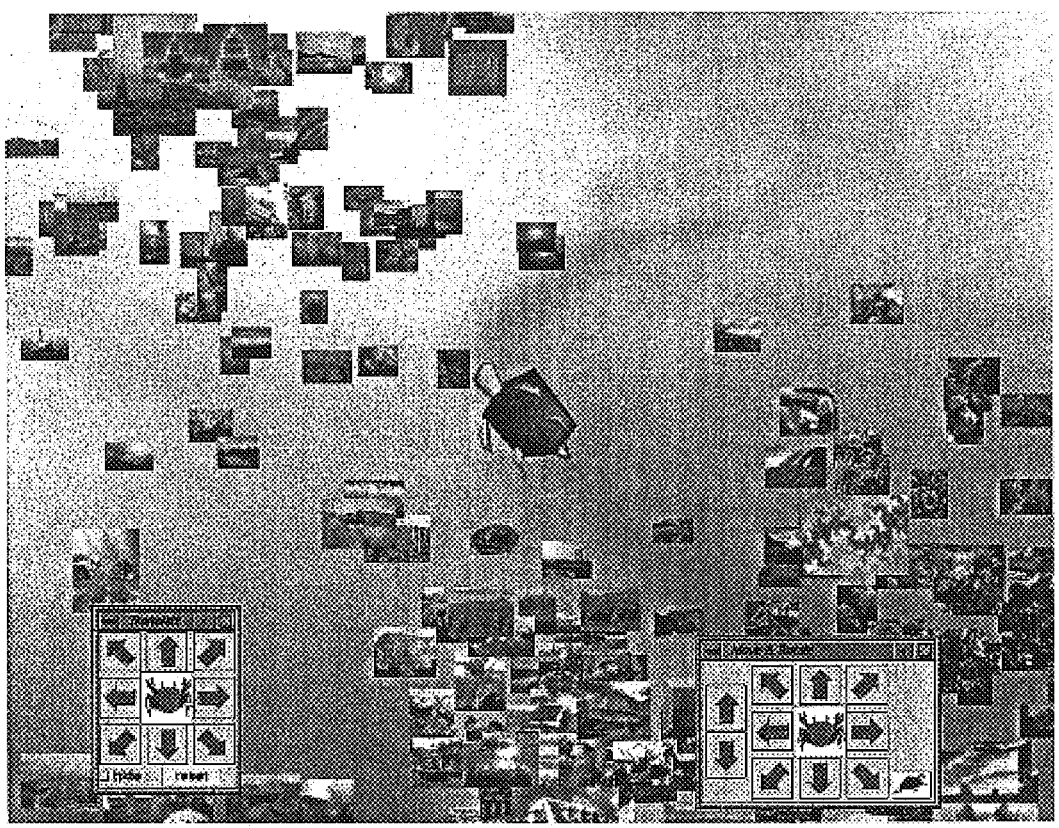
FIG. 10 is a diagram showing another display example of translation in the x-y plane from the view point of the crab as a reference object.

FIGS. 8, 9, and 10 show a display example in the case of performing translation to the upper left direction in the crab's view. To be specific, they show an example of displaying a state in which the turtle performs translation to the upper left by setting the mark of the button 310 in the panel 530 to the crab and clicking the button 312 with the arrow oriented to the upper left. The turtle faces to the upper left direction of the crab, and the display area on the screen is switched to the upper left direction. The position of the turtle is in the center of the display area 510.

Figure 11:
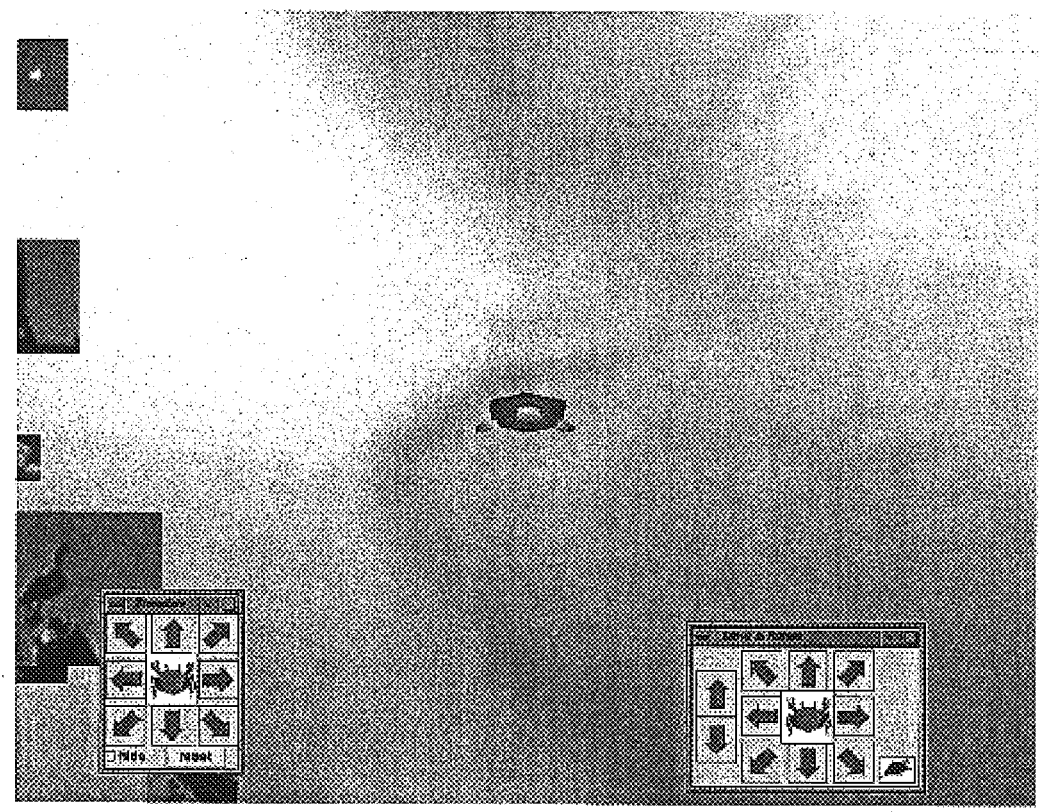
FIG. 11 is a diagram showing a display example in the case of seeing, from the line of sight of the crab, a turn in the upper right direction of the crab as a reference object when the turtle as a reference object is set in the center.
Figure 12:
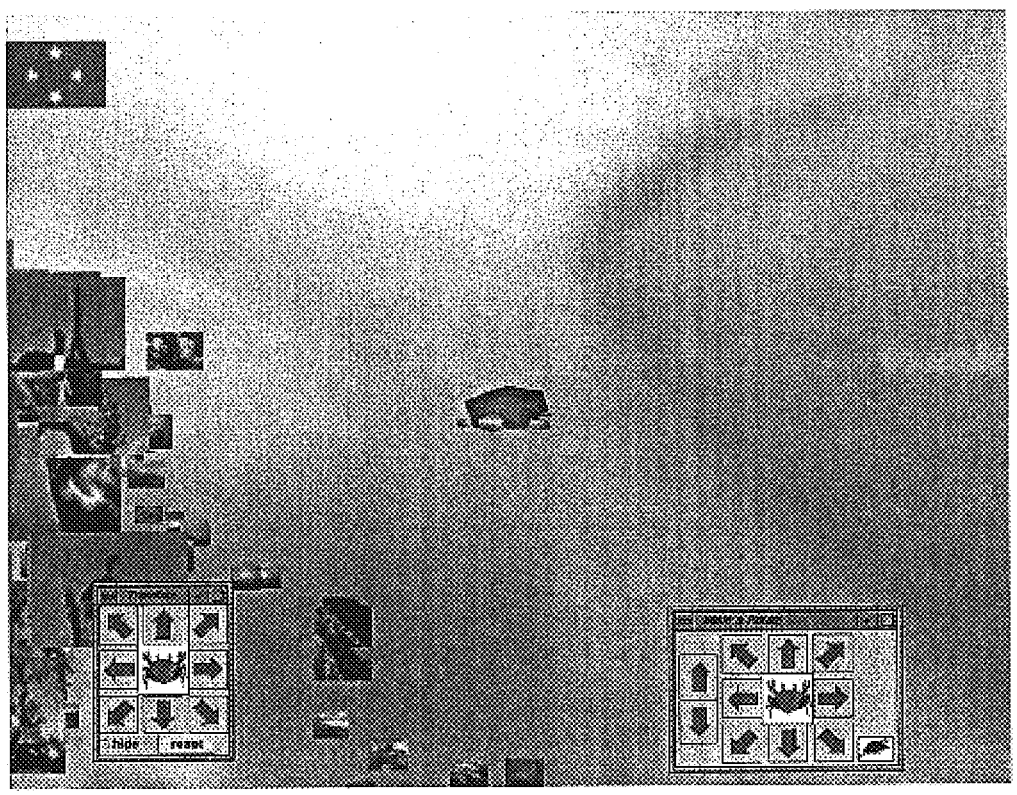
FIG. 12 is a diagram showing another display example in the case of seeing, from the line of sight of the crab, a turn in the upper right direction of the crab as a reference object when the turtle as a reference object is set in the center.
Figure 13:
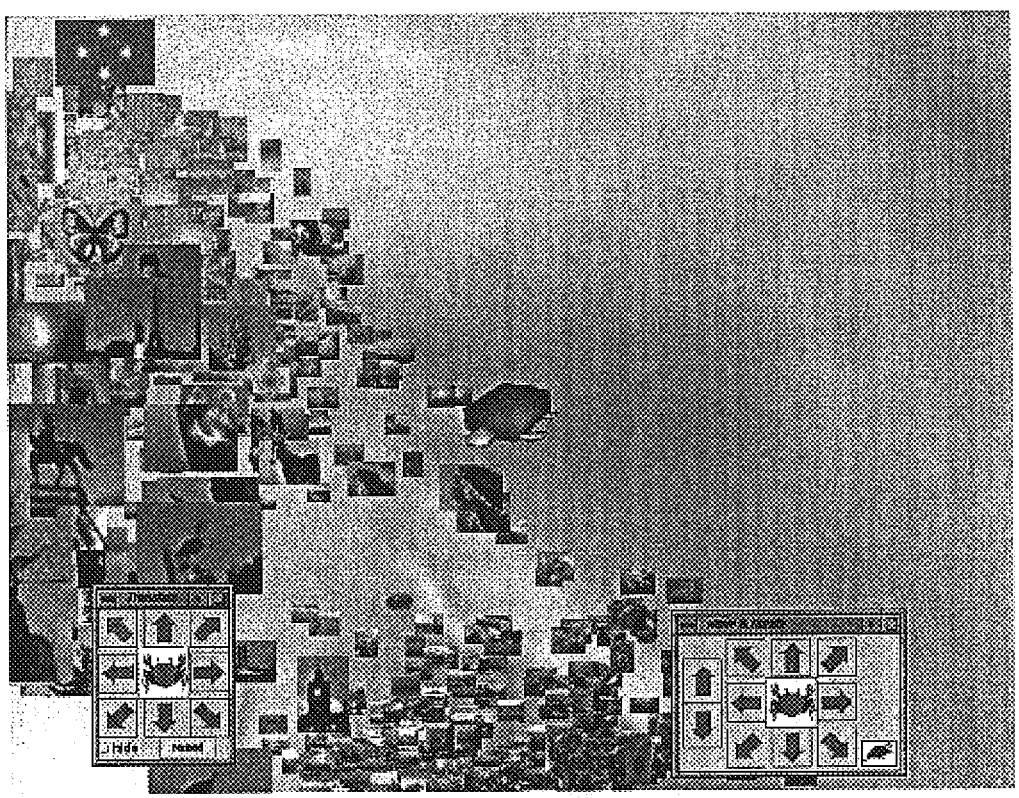
FIG. 13 is a diagram showing another display example in the case of seeing, from the line of sight of the crab, a turn in the upper right direction of the crab as a reference object when the turtle as a reference object is set in the center.

FIGS. 11, 12, and 13 show a display example of a case where a turn to the upper right direction of the crab around the turtle as a center is seen from the line of sight of the crab. In this case, by setting the mark on the button 410 in the panel 540 to the crab and clicking the button 411 with the arrow oriented to the upper right, a state where the crab turns to the upper right direction is displayed. In this case as well, the position of the turtle is in the center of the display area 510.

When the walk through is performed in practice by clicking the buttons in the panel 530 with reference to the images of the crab and turtle as the reference objects, the relative relations of the positions and orientations of the crab and turtle change. Since the turtle arbitrarily turns, from the turtle's view point, usually, the sight of the crab is often lost. On the other hand, since the crab revolves around the turtle while seeing the turtle, the turtle is always seen from the view point of the crab. However, due to the turns of both the reference objects, the orientation of the crab and that of the turtle do not always coincide with each other. In the case of controlling the view point of the turtle, there is an inconvenient case such that the orientation of the crab and that of the turtle do not coincide with each other. There is also a demand such that the user wishes to see an image seen by the turtle from the view point of the crab.

A button prepared to deal with such a case is a small button 430 positioned in the lower right in the panel 540 shown in FIG. 4. The button 430 provides the short-cut function with respect to the turn of the reference object. When the mark of the button 410 is the turtle, the crab is displayed on the button 430. In this case, when the button 430 is clicked, first, the turtle turns to orientation in which the orientation of the crab and the z direction are inverted, that is, the orientation that the turtle faces the crab. Subsequently, when the short-cut button 430 is successively clicked, the turn associated with the inversion in the z direction sequentially occurs. On the other hand, when the mark of the button 410 is the crab, the turtle is displayed on the button 430. In this case, when the button 430 is clicked, the crab turns to the same posture as that of the turtle. The crab revolves so as to make an orbital motion around the turtle as a center. In practice, the crab moves to the rear side of the turtle. When the button 430 for short-cut function is subsequently clicked, in a manner similar to the case of the turtle, the inversion in the z direction occurs and the crab moves to the front or rear side of the turtle.

All the turning motions are realized by successive turning motions around an axis as a center. The turn axis and the turn angle at that time are derived on a client program side.

One of the functions of the turtle as a reference object is a function of jumping to an image. By clicking an arbitrary image in the display area 510, the user can make the turtle jump to the position of the clicked image. The crab follows the jump of the turtle. By this function, the user can easily approach to a desired image.

Figure 14:
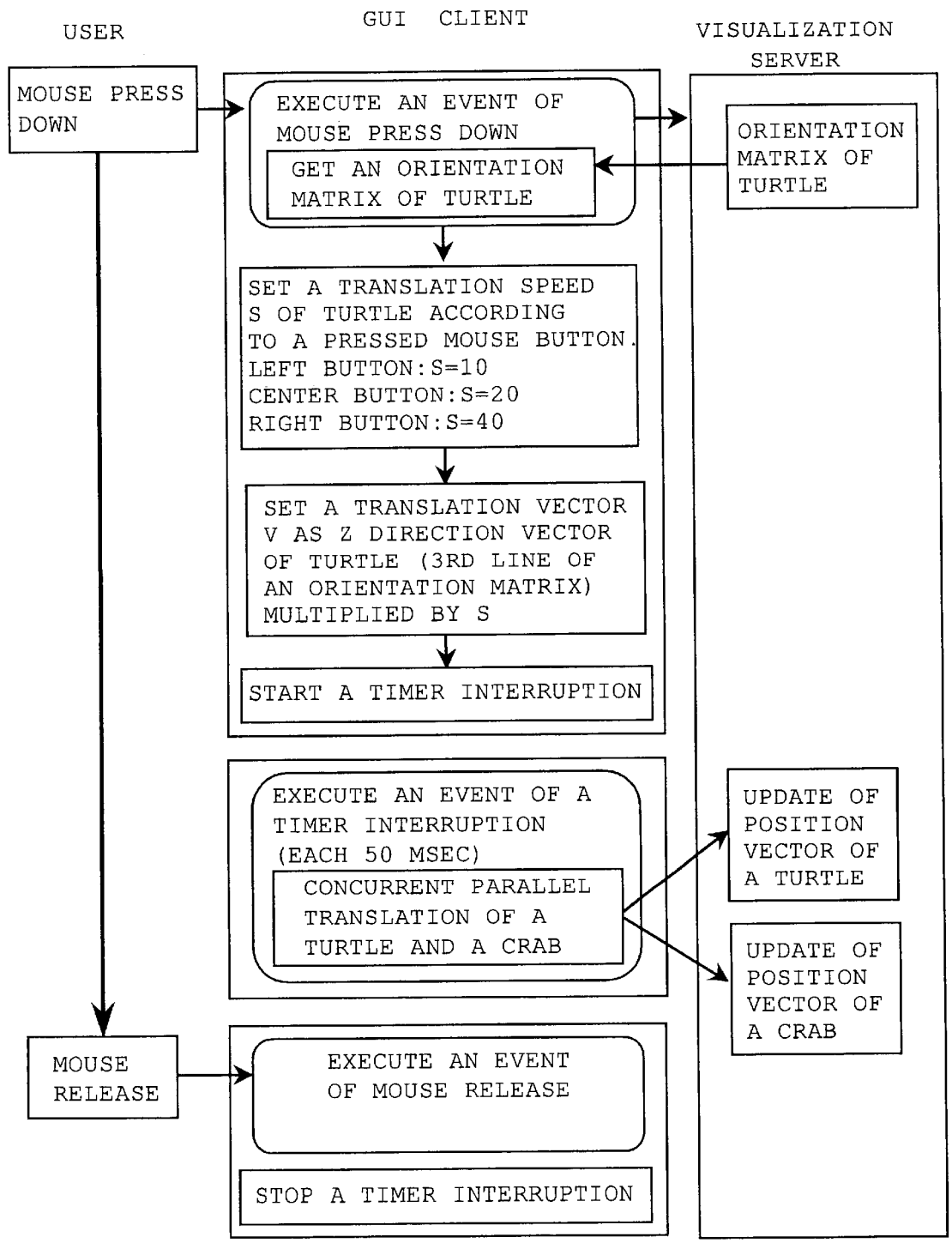
FIG. 14 is a flowchart showing a part of the motion of a reference object.

FIG. 14 is a flowchart showing the flow of processes for controlling the motion of the turtle as a reference object when the mark of the button 410 in the panel 540 is set to the turtle and the arrow button 420 for forward motion of the turtle is clicked. Since the control of various motions of other reference objects is similar to the above, the description will not be repeated.

When the user clicks a mouse button after clicking the arrow button for forward motion of the turtle, an event of mouse press down of the GUI client is executed. The GUI client gets an orientation matrix of the turtle at present by the visualization server. Various data to be displayed in the visualized space is stored in the visualization server. A translation vector is obtained by multiplying a vector in the z direction of the obtained orientation matrix by translation speed according to the selection of the mouse button. At the end of the press down event process, a timer interruption is started. After that, until the user releases the mouse button, the timer interruption on a predetermined unit basis occurs.

At each event of a timer interruption, a command for concurrent parallel translation of the reference objects is transmitted from the GUI client to the visualization server.

Second Embodiment

Walk Through in Virtual Museum

A second embodiment relates to a system for browsing a museum configured in a virtual three-dimensional space.

In the embodiment, a user interface is constructed so that the user understands that a reference object A which turns its head is the other self of a reference object B. In an initial state, both objects are coalesced in each other. In response to a request from the user, the other self appears or disappears.

Figure 15:
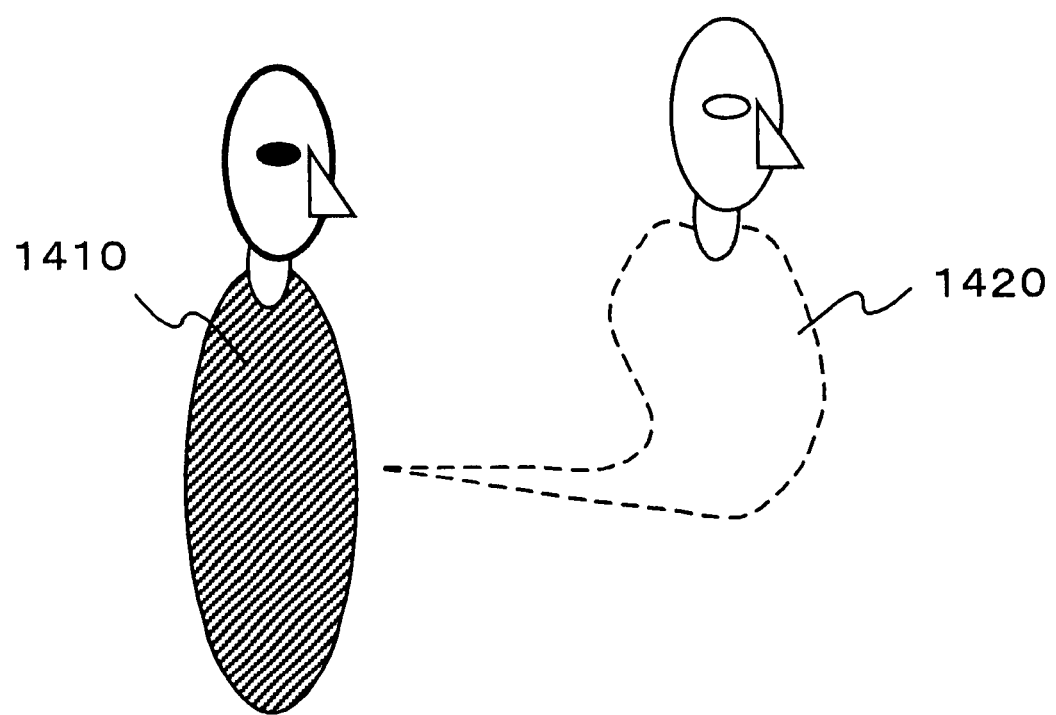
FIG. 15 is a conceptual diagram showing an image of a reference object of a second embodiment.

FIG. 15 is a conceptual diagram showing an image of the reference objects of the embodiment. The reference object B is the user's own self 1410. The reference object A is the other self 1420 positioned in front of the reference object B. In the embodiment, the user can walk through a museum as if the user himself/herself floats in a virtual 3D space.

Figure 16A:
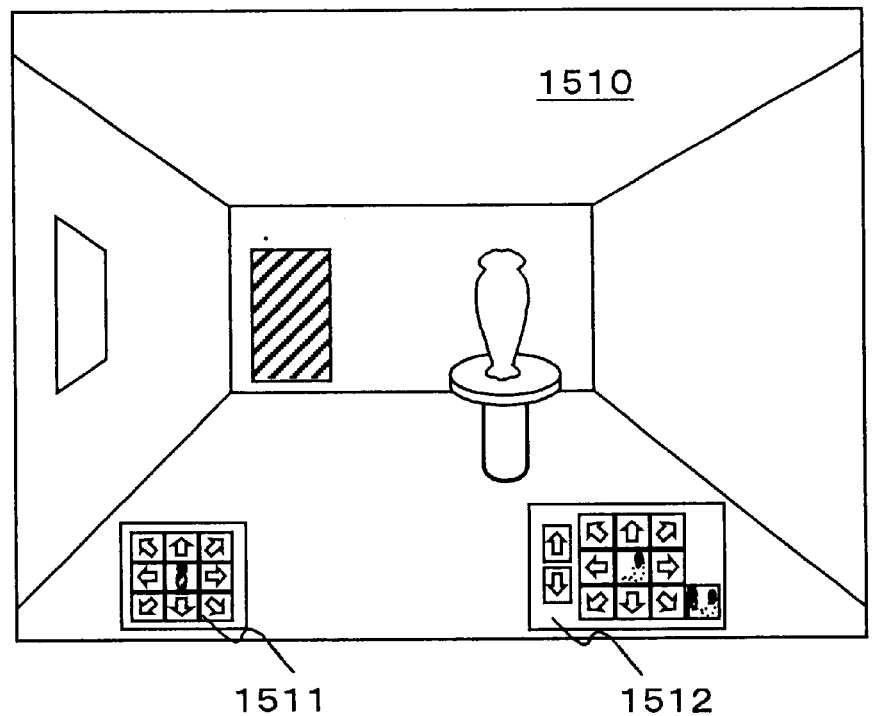
FIG. 16A is a conceptual diagram showing an example of an image in a virtual 3D display area displayed to the user in the second embodiment.
Figure 16B:
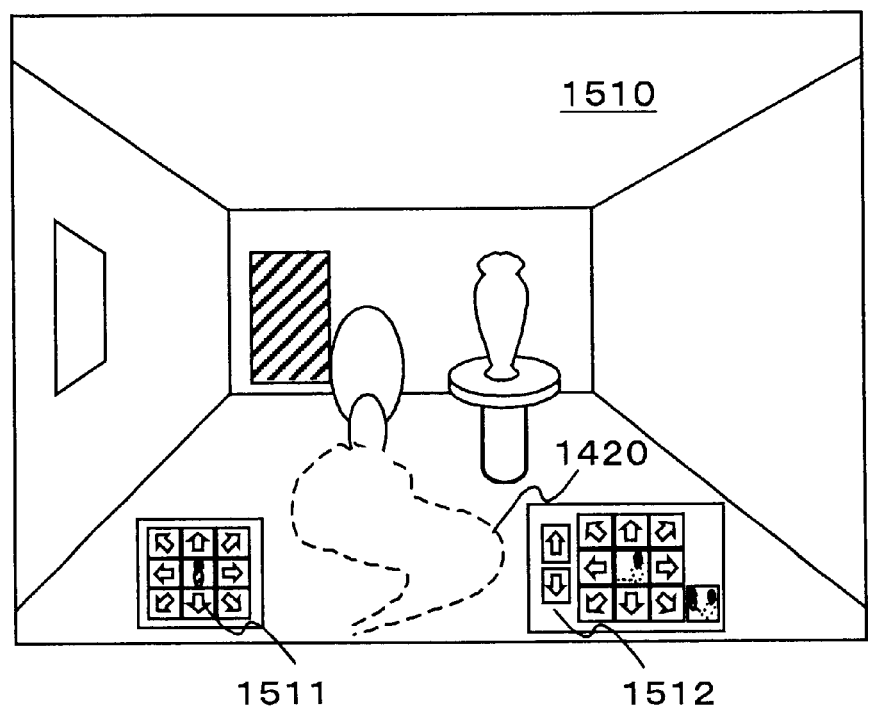
FIG. 16B is a conceptual diagram showing an example of an image in a virtual 3D display area in a state where one of reference objects is displayed in the display area.

FIGS. 16A and 16B show an example of images displayed to the user. In FIG. 16A, a state where the reference objects A and B are coalesced in each other is displayed. In a display area 1510, the state in the museum seen from the view point of the user himself/herself is displayed. Reference numerals 1511 and 1512 denote panels for the walk-through functions. FIG. 16B shows a display example in the case where the other self 1420 as the reference object A appears in the display area 1510.

The turning function and constraints of each of the reference objects at the time of movement in the second embodiment are similar to those of the first embodiment. The user himself/herself 1410 corresponds to the crab as a reference object and the other self 1420 corresponds to the turtle as a reference object.

Figure 17A:
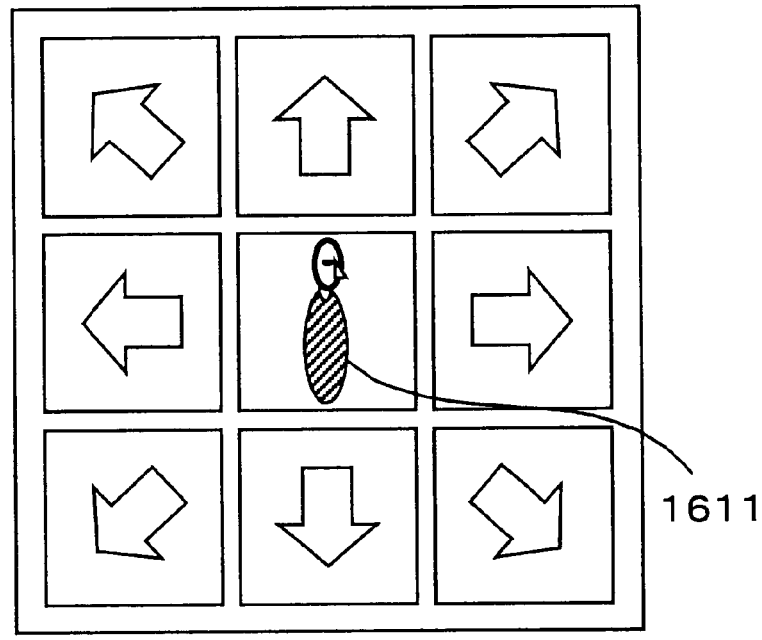
FIGS. 17A and 17B are enlarged views each for explaining one of panels displayed in each of the images of FIGS. 16A and 16B.
Figure 17B:
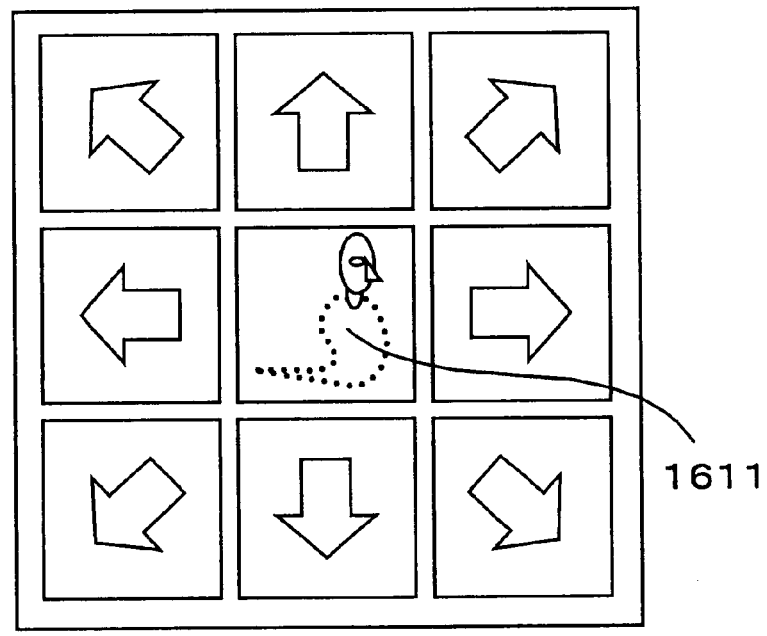

FIGS. 17A and 17B are enlarged views of the panel 1511. A button 1611 in the center of the panel is a button for switching the user's view point between the view point of the user himself/herself and the view point of the other self. In FIG. 17A, the mark on the button 1611 shows that the current view point is the view point of the user himself/herself. On the other hand, in FIG. 17B, the mark on the button 1611 shows that the current view is that of the other self. A state where both the objects are coalesced in each other is defined as a state where only the view of the user himself/herself exists. The view is not therefore switched and the panel is displayed as in FIG. 17A. Arrow buttons around the button 1611 are buttons for translation in the (x, y) plane.

Figure 18A:
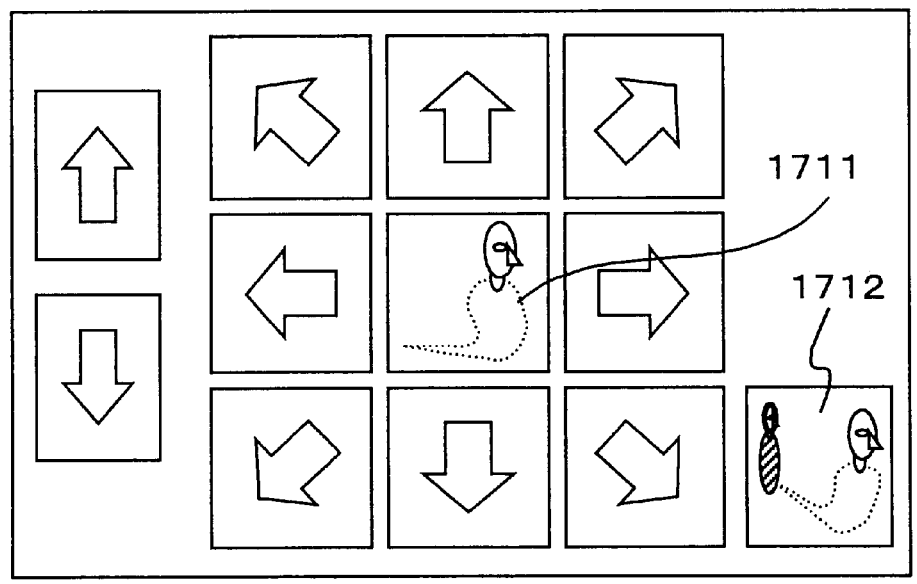
FIGS. 18A and 18B are enlarged views each for explaining another one of panels displayed in each of the images of FIGS. 16A and 16B.
Figure 18B:
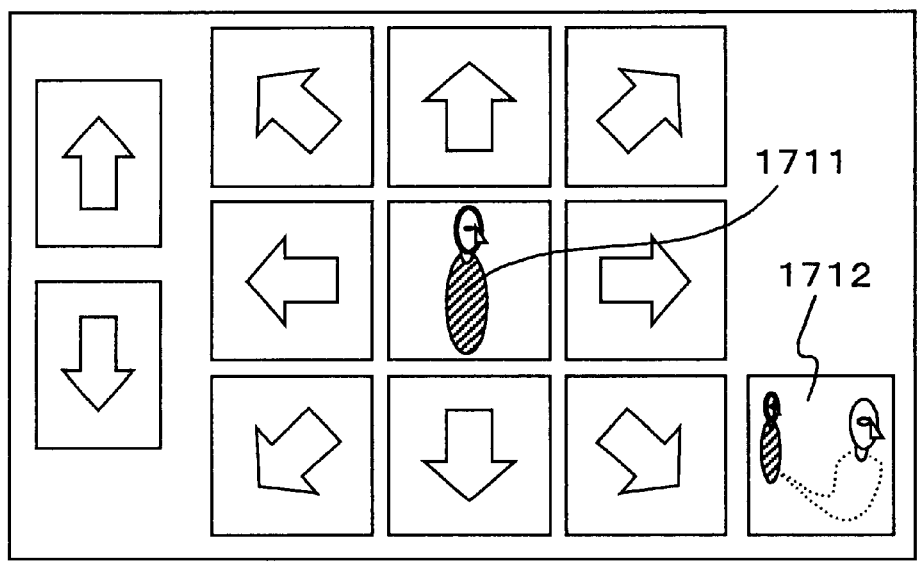

FIGS. 18A and 18B are enlarged views of the panel 1512. The panel 1512 is a panel used to turn and move forward/rearward of the reference object to be controlled which is displayed on the button 1711. In the state of the coalescence, the control target is always defined as the other self. The control target is not therefore switched and the panel is displayed as shown in FIG. 18A. The appearance or disappearance of the other self is switched by a button 1712. When the button 1712 is clicked in the coalescent state, the other self appears. In the initial state, the other self moves for a preset distance in front of the user himself/herself. In the other states, the other self moves to a position where the other self disappeared before and stops. The orientation of the other self at that time point is the same as that of the user himself/herself. After that, the control target can be switched to the user himself/herself or the other self. When the button 1712 is clicked in a state where the control target is the other self and the user himself/herself is separated from the other self, the other self moves backward to approach the user himself/herself. When the other self moves to a very close position which is almost the same position as that of the user himself/herself, the other self disappears. In the case where the view point at that time is that of the other self, after an image corresponding to the operation led to the disappearance is displayed, the panel display is switched from 17B to 17A. That is, the view point is changed to that of the user himself/herself. On the other hand, when the control target is the user himself/herself as shown in FIG. 18B, by the click on the button 1712, the user himself/herself approaches the other self and then the other self disappears. In this case, after displaying of an image corresponding to the operation led to the disappearance is finished, the panel display is switched from 18B to 18A. That is, the control target is changed from the user himself/herself to the other self.

Figure 19:
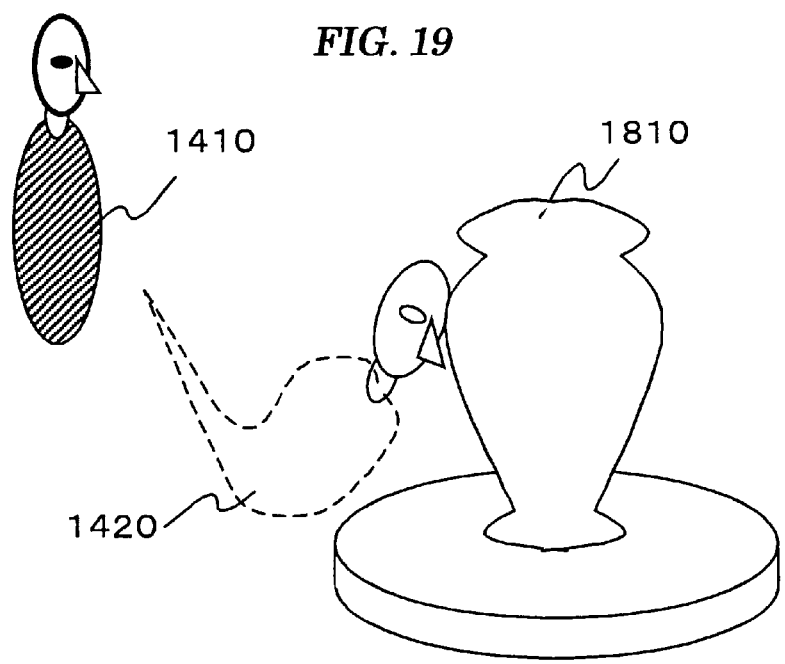
FIG. 19 is a conceptual diagram of a display image of the reference object by the operation of the reference objects in the second embodiment.

On the basis of the fundamental functions as described above, the user walks through the virtual museum. One of functions defined on the contents on the inside is a function of moving the other self to the center of an exhibit in response to a click on the exhibit in the museum. When the user himself/herself and the other self are coalesced in each other at that time point, the other self appears. FIG. 19 is a conceptual diagram showing an image held by the user at that time. The image is displayed in such a manner that the user feels so that the other self 1420 is attracted by a virtual art object 1810 watched by the user himself/herself 1410. After that, the user can walk around and watch the art object 1810.

Third Embodiment

Walk Through Using the Other Self in Information Space in Image Retrieval

A third embodiment relates to a case where the walk through method of the second embodiment is used in the image retrieval system of the first embodiment. The same system configuration as that of the system in the first embodiment shown in FIG. 1 is used. The display on the screen is basically the same as that in the display area in the virtual three-dimensional space in the first embodiment shown in FIG. 5 except that the panels 530 and 540 are replaced by the panels 1511 and 1512 shown in FIGS. 16A and 16B. The walk through function of the third embodiment is substantially the same as that of the second embodiment except for the point that the function of the button 1712 in the panel of FIGS. 18A and 18B is different.

In the third embodiment, the button 1712 is not a button of a switch type. Like the other arrow buttons, by continuously pressing the button 1712, a desired operation is performed.

When the button 1712 is pressed in a state where the user himself/herself is coalesced in the other self (display of the panel in FIG. 18B), the other self is separated. After that, while the button 1712 is pressed, the other self moves forward. When the button 1712 is released, the forward movement of the other self stops.

When the button 1712 is pressed in a state where the other self is separated and the control target is the other self (display of the panel in FIG. 18A), the other self turns to the orientation which coincides with the orientation of the user himself/herself. The other self moves backward to approach the user himself/herself. The other self is approaching until the button 1712 is released. When it is determined that the positions of them are the same, the other self disappears. When the button 1712 is released before it is determined that the positions of them are the same, the other self is close to the user himself/herself but does not disappear.

When the button 1712 is pressed in a state where the other self is separated and the control target is the user himself/herself (display of the panel in FIG. 18B), first, the user himself/herself turns so as to revolve around the other self and is oriented in the same manner as the other self. The above operations are the same as the operations performed in response to the click on the button 430 in the panel 540 in FIG. 4 in the case of the crab in the first embodiment. After that, when the button 1712 is continuously pressed, the user himself/herself approaches the other self. When it is determined that the positions of them are the same, the other self disappears. When the button 1712 is released before it is determined that the positions of them are the same, the other self does not disappear.

Fourth Embodiment

System Using External Input Equipment Having Buttons

In a fourth embodiment, the walk through is performed by using an external input equipment in place of the panel on the screen.

Figure 20:
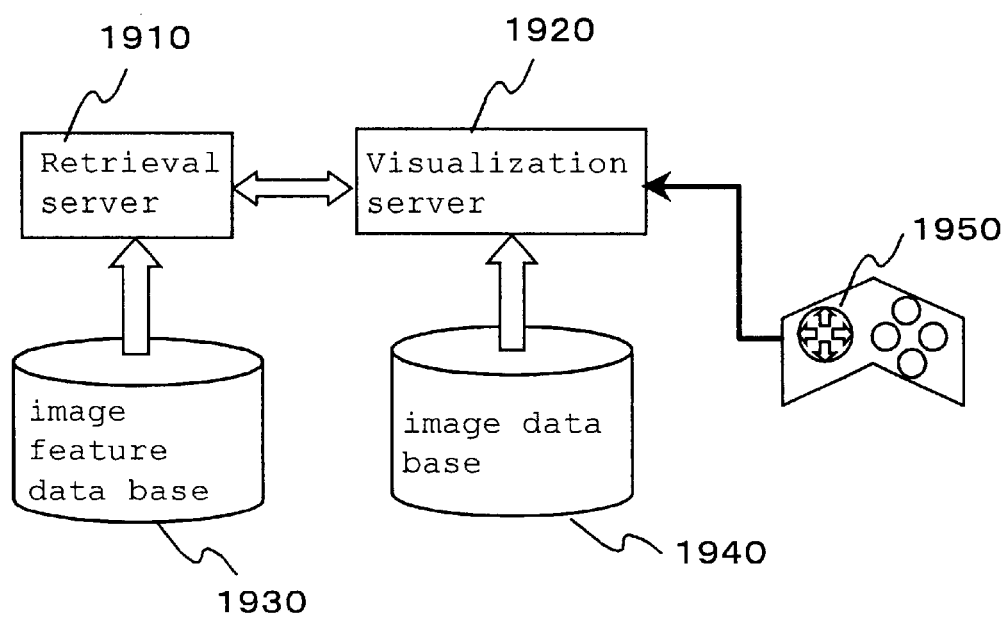
FIG. 20 is a block diagram showing a system configuration of a fourth embodiment.

FIG. 20 is a diagram showing the configuration of a system in the embodiment. Shown in the diagram are a retrieval server 1910, a visualization server 1920, a feature data base (DB) 1930, an image data base (DB) 1940, and an external input equipment 1950. Except for the visualization server 1920 and the external input equipment 1950, the same program as that of the retrieval server 110 in the first embodiment and the same data as that in the feature DB 140 and the image DB 150 can be used. The user interface of the system is controlled only by the visualization server 1920. The visualization server 1920 obtains an input from the user via the external input equipment 1950.

Figure 21:
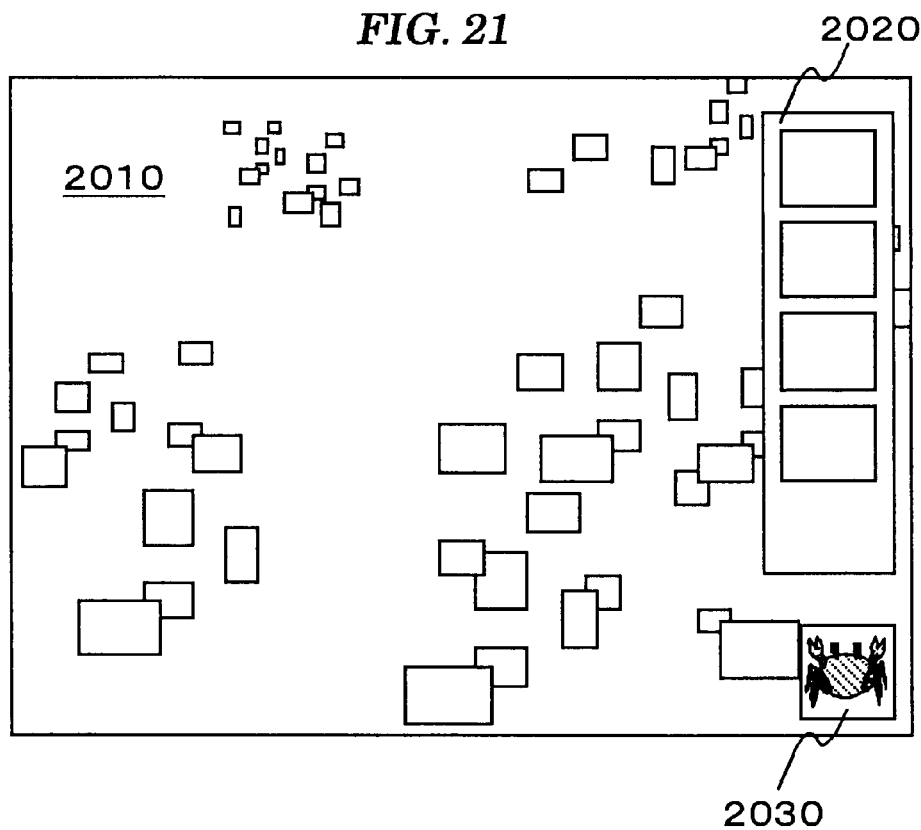
FIG. 21 is a diagram showing a display area and a display example of a panel in the fourth embodiment.

FIG. 21 shows a display example of the embodiment. The visualization server 1920 displays, in addition to a group of small images shown by squares of various sizes spread in a display area 2010 in a virtual three-dimensional visualization space, a panel 2020 for displaying a list of retrieval key images and a small image 2030 indicating the current view. The panel 2020 and the small image 2030 correspond to the panel 520 shown in FIG. 5 in the first embodiment and the button 310 in the panel 530 shown in FIG. 3, respectively. Different from the panel displayed by the GUI client 130 in the system of the first embodiment, the panels 2020 and 2030 are displayed as plate-shaped virtual three-dimensional objects existing in front of the observer. The display position is defined relative to the view point of the observer. Even when the walk through is performed, the position in the screen is not changed.

Figure 22:
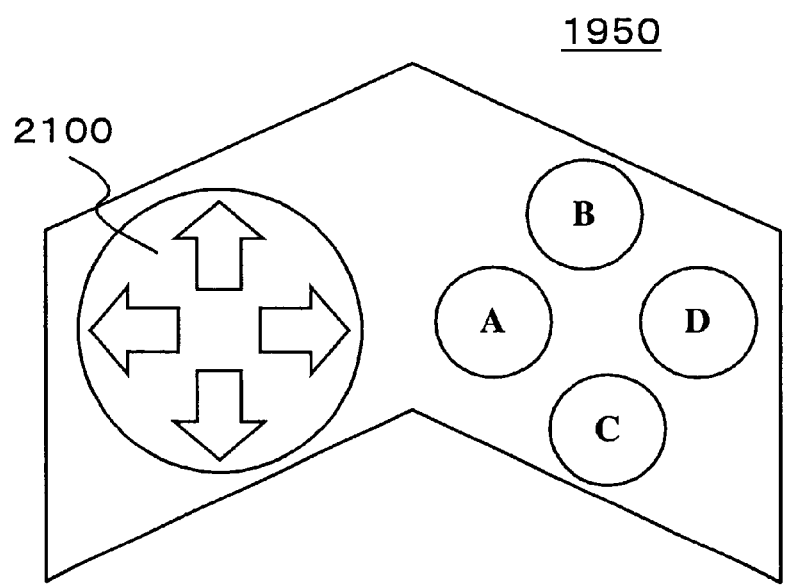
FIG. 22 is a diagram showing an example of the configuration of an external input equipment for operation of the user in the fourth embodiment.

FIG. 22 shows the external input equipment 1950 used in the embodiment. On the external input equipment 1950, a cursor button 2100 having a degree of freedom of eight directions and four buttons A, B, C, and D exist.

A key image in the display area 2010 is selected in such a manner that the button C is pressed to display a cursor in the display area 2010, a desired image is designated by the cursor by operating the cursor button 2100 and, after that, the button C is released. The cursor is jumped onto an arbitrary image in such a manner that the button D is pressed to display a cursor in the display area 2010, a desired image is designated by the cursor by operating the cursor button 2100 and, after the button D is released.

The view point is switched between the crab and the turtle by concurrently pressing the two buttons A and B. The concurrent parallel translation of the current view point in the (x, y) plane or the (x, z) plane is performed by the cursor button 2100. The switching between the (x, y) plane and the (x, z) plane is performed by concurrently pressing the two buttons C and D. The concurrent parallel translation is performed in a manner similar to that in FIG. 3 in the first embodiment. For example, in the translation in the (x, z) plane from the crab's view point, first, the turtle is oriented in the designated direction in the (x, z) plane of the crab. After that, the turtle moves forward and the crab follows it.

When the turning direction is designated by pressing the cursor button 2100 while pressing the button A, the crab turns. When the turning direction is designated by pressing the cursor button 2100 while pressing the button B, the turtle turns. Only the up and down buttons become effective in the cursor button 2100 immediately after the turn, and the turned reference object can move forward and backward (translation in the z direction). In the case where the button A or B is simply pressed, similarly, immediately after the button is pressed, the cursor button serves as a button for moving the corresponding reference object (the crab for the button A and the turtle for the button B) forward and backward. The forward/backward motion mode is cancelled by pressing the corresponding button A or B again, thereby returning to the mode of translation in the (x, y) plane or (x, z) plane of the current view point.

With respect to the short-cut function of the crab or turtle corresponding to the button 430 in the panel 540 in FIG. 4, the short-cut function of the crab is performed by concurrently pressing the two buttons A and C. The short-cut function of the turtle is performed by concurrently pressing the two buttons B and D.

The present invention realizes both the function of a turn according to the view point in virtual three-dimensional display and the function of revolution around the target on the user interface having easy operability. Thus, the user can easily, freely walk through a virtual three-dimensional space and take a view of an object in the space.

While the present invention has been described above in conjunction with the preferred embodiments, one skilled in the art would be enable by this disclosure to make various modifications to these embodiments and still be within the scope and spirit of the invention as defined in the appended claims.

What is claimed is:

1. An object displaying method in a system which includes at least one object to be displayed in a virtual three-dimensional space, two reference objects A and B displayed in said virtual three-dimensional space, a panel for controlling, by user instruction, said reference objects being displayed, and display means for displaying said object, said object displaying method comprising:

moving said reference object A in the virtual three-dimensional space;

translating said reference object B while maintaining a relative position with said reference object A when said reference object A is moved in the virtual three-dimensional space;

revolving said reference object B around an origin defined in said reference object A as a center;

changing a radius of turn of said reference object B; and switching display contents of the object displayed in the virtual three-dimensional space between display from a view point of said reference object A and display from a view point of said reference object B.

2. An object displaying method in a virtual three-dimensional space according to claim 1, wherein said panel for controlling said object is displayed on said display means together with an object or a plurality of objects displayed in said virtual three-dimensional space.

3. The object display method in a virtual three-dimensional space according to claim 1, wherein said panel for controlling said reference objects an external input equipment connected to said system and has a plurality of operation buttons which can be selectively operated.

4. The object display method in a virtual three-dimensional space according to claim 1, wherein said panel for controlling said reference objects has a function of making orientations of said two reference objects coincide with each other.

5. An object displaying method in a system which includes at least one object to be displayed in a virtual three-dimensional space, two reference objects A and B displayed in said virtual three-dimensional space, a panel for controlling, by user instruction, said reference objects being displayed, and display means for displaying said object, said object display method comprising:

instructing coalescence or separation of said reference objects A and B in said virtual three-dimensional space;

moving said reference object A in the virtual three-dimensional space;

translating said reference object B while maintaining a relative position with said reference object A when said reference object A is moved in the virtual three-dimensional space;

revolving said reference object B around an origin defined in said reference object A as a center;

changing a radius of turn of said reference object B; and switching display contents of the object displayed in the virtual three-dimensional space between display from a view point of said reference object A and display from a view point of said reference object B, wherein when said reference objects A and B are coalesced with each other, said reference objects A and B are controlled as said reference object A by said panel, an image of said object from the view point of said reference object B is displayed on said display means.

6. The object display method in a virtual three-dimensional space according to claim 5, wherein said panel has a button for realizing a function of instructing coalescence or separation of said reference objects A and B, wherein when said button is continuously pressed in a state where said reference objects A and B are coalesced with each other, said reference objects A and B are separated from each other and said reference object A moves forward, and wherein when said button is continuously pressed in a state where said reference objects A and B are separated from each other, and when said reference object A approaches said reference object B within a predetermined distance, said reference objects A and B are coalesced with each other.

7. A recording medium having recorded thereon a program for displaying an object in a system, which includes at least one object or a plurality of objects to be displayed in a virtual three-dimensional space, two reference objects A and B displayed in said virtual three-dimensional space, a panel for controlling, by user instruction, said reference objects being displayed, and display means for displaying said object, wherein said program when executed causes said system to perform the steps of:

moving said reference object A in the virtual three-dimensional space;

translating said reference object B while maintaining a relative position with said reference object A when said reference object A is moved in the virtual three-dimensional space;

revolving said reference object B around an origin defined in said reference object A as a center;

changing a radius of turn of said reference object B; and switching display contents of the object displayed in the virtual three-dimensional space between display from a view point of said reference object A and display from a view point of said reference object B.

8. A recording medium having recorded thereon a program for displaying an object in a system which includes at least one object to be displayed in a virtual three-dimensional space, two reference objects A and B displayed in said virtual three-dimensional space, a panel for controlling, by user instruction said reference objects displayed and display means for displaying said object, wherein said program when executed causes said system to perform the steps of:

instructing coalescence or separation of said reference objects A and B in said virtual three-dimensional space;

moving said reference object A in the virtual three-dimensional space;

translating said reference object B while maintaining a relative position with said reference object A when said reference object A is moved in the virtual three-dimensional space;

revolving said reference object B around an origin defined in said reference object A as a center;

changing a radius of turn of said reference object B; and switching display contents of the object displayed in the virtual three-dimensional space between display from a view point of said reference object A and display from a view point of said reference object B, wherein said instructing step includes:

when said reference objects A and B are coalesced with each other, controlling said reference objects A and B as said reference object A by said panel, displaying an image of said object from the view point of said reference object B on said display means.

9. A storage medium according to claim 8, wherein said panel has a button for realizing a function of instructing coalescence or separation of said reference objects A and B, wherein when said button is continuously pressed in a state where said reference objects A and B are coalesced with each other, said reference objects A and B are separated from each other and said reference object A moves forward, and wherein when said button is continuously pressed in a state where said reference objects A and B are separated from each other, and when said reference object A approaches said reference object B within a predetermined distance, said reference objects A and B are coalesced with each other.

* * * * *